United States Patent

Spencer

[15] 3,646,520

[45] Feb. 29, 1972

[54] ADAPTIVE READING CIRCUIT FOR A DISK MEMORY

[72] Inventor: Robert Graham Spencer, North Aurora, Ill.

[73] Assignee: Bell Telephone Laboratories, Incorporated, Murray Hill, Berkeley Heights, N.J.

[22] Filed: May 25, 1970

[21] Appl. No.: 39,974

[52] U.S. Cl. ........................................................340/172.5

[51] Int. Cl. ....................................G11b 5/02, G11b 31/00

[58] Field of Search ...............................340/172.5, 174.1 A

[56] References Cited

UNITED STATES PATENTS

| | | | |
|---|---|---|---|
| 3,417,378 | 12/1968 | Simonsen et al. | 340/172.5 |
| 3,417,377 | 12/1968 | Vietor et al. | 340/172.5 |
| 3,417,375 | 12/1968 | Packard | 340/172.5 |
| 3,266,024 | 8/1966 | Kersey et al. | 340/172.5 |

*Primary Examiner*—Paul J. Henon
*Assistant Examiner*—Ronald F. Chapuran
*Attorney*—R. J. Guenther and R. B. Ardis

[57] ABSTRACT

A circuit arrangement wherein a local oscillator is phase locked to information read from a timing track on a disk memory and serves to generate output pulses having a repetition rate several times higher than the repetition rate of the information on the timing track. For each data track of the memory there is provided a data-receiving circuit which comprises a shift register having its input connected to a data track reading circuit. Initially, data obtained from a corresponding data track is shifted through the shift register at a relatively high rate corresponding to the repetition rate of the local oscillator circuit. A sequence-detecting circuit is connected to a plurality of stages of the shift register for detecting the presence of a significant pattern of binary digits in the connected stages and for generating a discrete output signal upon the detection of this discrete pattern. Control circuitry which is responsive to the output signal of the sequence-detecting circuit serves to stop the advancing of data through the shift register at the previously noted higher repetition rate and initiates the advancing of the data through the shift register at a lower rate which corresponds to the rate at which information occurs on the timing track. The change in rate occurs synchronously with the occurrence of the output signal of the sequence-detecting circuit.

7 Claims, 1 Drawing Figure

PATENTED FEB 29 1972 3,646,520
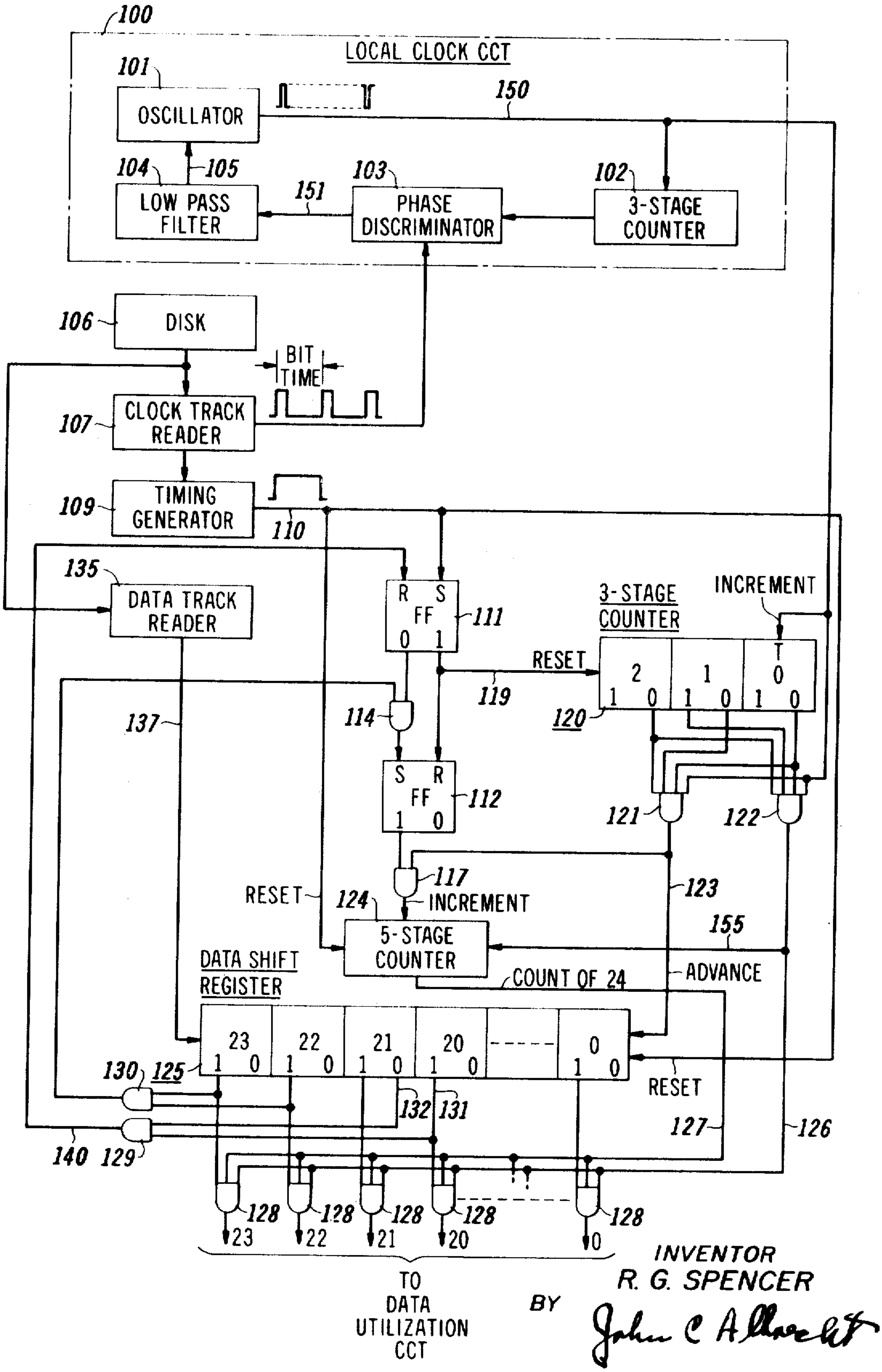
INVENTOR
R. G. SPENCER
BY John C Albrecht
ATTORNEY

ADAPTIVE READING CIRCUIT FOR A DISK MEMORY

BACKGROUND OF THE INVENTION

1. Field of the Invention

This invention is concerned with circuits for reading data from sequential memories such as magnetic disk memories. More particularly, this invention is concerned with an adaptive data-reading circuit which automatically compensates for both the fixed and variable delays which occur in disk writing circuitry in order to accurately define the optimum times at which the process information obtained from each of the tracks and sectors of such a memory.

2. Description of the Prior Art

Sequential memories, such as magnetic disk memories, are employed extensively in present day data-processing systems. A magnetic disk memory generally comprises at least one timing track and a plurality of data tracks. The information stored in the timing track comprises a sequential pattern which defines bit positions of the data tracks. The information in the timing track is semipermanent in nature and is generally placed on the disk at a time other than the times at which data is placed in the various data tracks of the disk. Furthermore, separate reading and writing heads are employed for the timing track and the individual data tracks.

In order to minimize data access time and to optimize disk surface usage, data is packed in the tracks of the disk as tightly as possible. The packing density is a direct function of the resolving ability of the read and write heads. Additionally, packing density is affected by variables which occur in the reading and writing circuitry and in the control of disk speed with the passage of time and changes in environmental conditions, e.g., temperature. The present invention and a number of prior art arrangements recognize the undesirable effects of such variations. In disk memories which employ a relatively low packing density data read from a data track may be sampled directly in synchronism with information obtained from the timing track. As higher packing density is employed, arrangements may be provided for adjusting reading and writing head positions. However, such arrangements are costly, unwieldly, and do not provide an adequate solution to a disk memory in which high packing densities are employed.

In one solution to this problem, data in a sector is preceded by a preamble which comprises a sequence of pairs of binary "1" and "0." The number of pairs is a direct function of the granularity of selection of the optimum time of sampling data obtained from a data track. For example, if one wishes to define and select one out of eight sampling intervals the preamble must comprise eight pairs of "1" and "0." Additionally, this particular prior art arrangement utilizes timing information taken directly from the timing track on the disk and data reading is relative to this timing track information. In the event of noise on the timing track, data-reading pulses for processing data on a data track may be lost or added. Noise in the sense employed herein may serve to erroneously delete or to add timing pulses. Another solution to this problem is set forth in U.S. Pat. No. 3,195,118 wherein information derived from a clock track is employed in sampling data obtained from a data track. The arrangements set forth in this patent do not lend themselves to high disk data densities since they contemplate a clock track having data stored with a greater density than the data density in the data tracks. Additionally, these prior art arrangements employ separate circuitry for processing the information obtained from the clock track and from the data tracks; therefore, variations with time in the two paths employed will introduce errors in sampling times.

SUMMARY OF THE INVENTION

In accordance with this invention, a local clock circuit which is phase-locked to the information obtained from the timing track of a disk is employed to generate data-sampling pulses having a pulse repetition rate several times the repetition rate of the information occurring on the clock track. Data in a sector as in the one above-mentioned prior art arrangement, is preceded by a preamble which comprises at least one pair of "1" and "0." The preamble is followed by a discrete start pattern which comprises a pair of "1's." Initially, data read from a data track is advanced through a receiving shift register at a rate which corresponds to the repetition rate of the local clock circuit. A sequence-detecting circuit which is connected to particular stages of the data shift register serves to recognize at least one of said pairs of "1" and "0" of the preamble and the "start pattern" which comprises the pair of "1's.' Upon detection of the preamble pattern followed by the start pattern, the rate at which data is shifted through the data shift register is changed from the pulse repetition rate of the local clock circuit to a rate which corresponds to the rate at which information occurs on the disk clock track. This change occurs in synchronism with the detection of the above-noted preamble-start sequence. The pulses which serve to advance the data through the data shift register at the lower pulse repetition rate comprise output signals of a binary counter which is driven by output signals of the local oscillator circuit.

It is an object of this invention to accurately define the optimum time at which to sample data read from a data track of a serial memory such as a magnetic disk memory having a timing track and at least one data track. It is another object of this invention to provide optimally defined sampling pulses for circuit arrangements which serve to process data obtained from a serial memory such as a magnetic disk memory independently of the passage of time and environmental conditions.

In accordance with one feature of this invention, a local clock circuit which is phase locked to information obtained from the track of a serial memory provides a sequence of accurately timed sampling pulses having a pulse repetition rate at least several times the rate of information obtained from the memory clock track. In accordance with another feature of this invention, a single data path is employed to process preamble information and following message data whereby variations in such circuitry do not affect the accuracy with which data-sampling pulses are selected.

In accordance with another feature of this invention, data may be gated from a receiving data shift register to a data utilization circuit at times which clearly do not conflict with the times at which data is being moved through the data shift register. The above and other objects and features of this invention will be more readily understood from the following description when read with respect to the drawing in which:

The FIGURE is a schematic diagram of an adaptive data-processing circuit in accordance with my invention.

DETAILED DESCRIPTION

The details of the disk 106 are not shown since such details are not required for an understanding of my invention. It is sufficient to note that the disk 106 has at least one clock track and one or more data tracks. In this illustrative embodiment of my invention the clock track serves to generate a pulse for each possible bit position of the data track. The selection of a clock pulse for each possible bit position is arbitrary and other arrangements, for example an arrangement wherein a pulse occurs in alternate bit positions of the clock track, will suffice equally as well. It is important to note, however, that the density with which information is packed in the clock track is equal to or less than the density with which information is packed in the data track. Accordingly, the maximum possible packing density consistent with the resolution of the reading and writing heads and the inherent delays in the circuitry may be employed.

Connected to the disk 106 are a clock track reader 107 and a data track reader 135. Where a single clock track is employed it is necessary to provide a discrete origin signal on that track. The origin signal merely defines a reference point from which the limits of data track sectors can be defined. The output of the clock track reader 107 is connected to the timing generator 109 which serves to generate sector start signals on conductor 110. The sector start signals occur at fixed bit positions after occurrence of the above-noted origin signal. For example, if a disk is divided into ten sectors the timing generator 109 serves to generate ten sector start signals during each rotation of the disk. The sector start signals on conductor 110 serve to initialize the flip-flop 111, the five-stage counter 124, and the data shift register 125 at the beginning of each sector of the disk. The initialization of the flip-flop 111 serves to reset the flip-flop 112 to the "0" state and to reset the three-stage counter 120 to the count of zero.

The local clock circuit 100 comprises a voltage control oscillator 101, the three-Stage Counter 102, the phase discriminator 103, the low pass filter 104, and the connection 105. The local oscillator 101 has a natural frequency of approximately *n* times the repetition rate of information read from the clock disk track. In this one illustrative example the oscillator 101 generates output pulses having a pulse repetition rate approximately eight times the repetition rate of information read from the disk clock track. The three-stage counter 102, the phase discriminator 103, the low pass filter 104, and the connection 105 serve to phase lock the output pulses of the oscillator 101 to the pulses occurring on the disk clock track and to make the frequency of the oscillator be exactly eight times the repetition rate of the information occurring on the disk clock track. The input signals to the phase discriminator 103 comprise the output of the three-stage counter 102 and the output of the clock track reader 107. The output signals of the three-stage counter 102 have a pulse repetition rate of one-eighth the pulse repetition rate of the output pulses of the oscillator 101 and thus correspond in frequency to the information occurring on the disk clock track. The phase discriminator 103 generates a voltage on conductor 151 which is proportional to the difference in phase of the above-applied input pulses. The low pass filter 104 serves to remove high-frequency variations in the signal occurring on conductor 151 and thus applies a slowly varying signal to the input of the oscillator 101 via the connection 105. The oscillator output signals occurring on conductor 150 are phase locked to the information obtained from the clock track reader 107 and these signals have a pulse repetition rate of eight times the rate of the information on the disk clock track.

With the flip-flop 111 in its initialized "1" state and the three-stage counter 120 in its initialized "count-of-zero" state, data will be advanced through the data shift register 125 at a rate which corresponds to the pulse repetition rate of the pulses on conductor 150. Advance pulses are applied to the data shift register 125 via the AND-gate 121 and conductor 123. As seen in FIG. 1, the "0" output terminals of the three stages of the counter 120 and the conductor 150 comprise the inputs to the gate 121. The three-stage counter 120 is held in its "-count-of-zero" state by the DC signal on conductor 119 which is connected to the "1" output terminal of the flip-flop 111. Accordingly, under the previously described initial conditions the information on conductor 123 comprises pulses which correspond in time and frequency to the output of the oscillator 101.

The data which is applied to the input terminal of the data shift register 125 comprises the output of the data track reader 135 which is connected to its corresponding data track of the disk 106. Near the beginning of a sector a short preamble comprising pairs of "1" and "0" occurs. As a practical matter, two or three such pairs are employed. However, a single pair will suffice. As seen in FIG. 1, the data shift register 125 is reset to the all "0" state upon the occurrence of the sector start pulse on conductor 110. As data from a fresh sector is advanced through the stages of the data shift register 125, a "1–0 " pattern of binary bits will occur in stages 20 and 21. The input conductors to the AND-gate 129 comprise the conductors 131 and 132 which are connected to the "1" and "0" output terminals of stages 20 and 21, respectively. Upon the occurrence of a "1" and "0" bit pattern in stages 20 and 21, AND-gate 129 will be enabled and will generate an output signal on conductor 140 which serves to reset the flip-flop 111 to the "0" state. Since data is initially advanced through the data shift register 125 at a rate which is eight times the bit rate of information occurring on the data track, the advance pulses, in effect, define eight phases of the bit times. The data which occurs at the output of the data track reader 135 is in a "non-return-to-zero" code and the advance pulse which served to shift the "1–0" pattern into stages 20 and 21 of the data shift register 125 may be taken as a significant reference point in time for defining the optimum time at which to sample succeeding data pulses. Upon detection of the significant pattern in stages 20 and 21, the rate at which data is advanced through the data shift register 125 is reduced to a rate which corresponds to the rate at which information occurs on the disk clock track. Since prior to the time at which the shift in rate of advance occurred data had been advanced at a rate exceeding three times the rate at which data occurs on the disk data track, the stages 21, 22, and 23 will all be in the "0" state at the time the significant pattern is detected in stages 20 and 21. Subsequently, as data obtained from the data track reader 135 is advanced through the shift register at the lower repetition rate, the contents of the data shift register 125 will correspond to the data which follows the recognized significant preamble pattern of "1" and "0."

At some time after AND-gate 129 has been enabled and flip-flop 111 set to the "1" state, the "start pattern" comprising a pair of "1's" will occur in stages 22 and 23 of the data shift register 125. The occurrence of this pattern in stages 22 and 23 will serve to enable AND-gate 130 and thus enable AND-gate 114 to set the flip-flop 112 to its "1" state. The flip-flop 112, as will be described later herein, is employed to control the incrementing of the five-stage counter 124 for the purpose of gating words of a data message out of the data shift register 125.

The change in rate of advancing data through the data shift register 125 occurs when the AND-gate 129 is enabled and the flip-flop 111 is reset to its "0" state. As seen in FIG. 1, a DC connection between the "1" output terminal of the flip-flop 111 and the reset terminals of the three-stage counter 120 serves to hold this counter in the "count-of-zero" state. When the flip-flop 111 is reset the clock pulses on conductor 150 serve to repetitively increment the count in the three-stage counter 120. As the count in the three-stage counter 120 departs from the count of zero, the AND-gate 121 is inhibited and advance pulses cannot reach the data shift register 125. The three-stage counter 120 continues to cycle and on the occurrence of each eighth pulse on conductor 150 the AND-gate 121 is enabled and the data shift register 125 is advanced one stage. The phase relationship of these advance pulses to the pulses obtained in the disk clock track is the same as the phase relationship of the signal on conductor 140 to the clock track pulse which coincided in time with the pulse on conductor 140. Since the sector preamble, the sector start signal, and the sector data were all placed on the data track at the same time and under the same circuit and environmental conditions, the advance pulses which are generated by the cycling of the three-stage counter 120 are in an optimum phase relationship with the data pulses for the purpose of sampling those data pulses. It should be noted that the incrementing of the three-stage counter 120 is initiated at a point in time corresponding approximately to the occurrence of the pulse on conductor 140 and that the three-stage counter serves to count the pulses on conductor 150 and to generate an advance pulse at a repetition rate which is one-eighth the repetition rate of the pulses on conductor 150.

Advantageously, the clock pulses on conductor 150 are independent of any possible noise on the disk clock track and since the sector preamble and the sector data flow through the same path which comprises the data track reader 135, the conductor 137, and the data shift register 125, data sampling occurs at optimum times even thought there may be changes in circuit behavior due to the passage of time. In this one illustrative example, a 24-bit data word is employed. When the sector start signal which comprises a pair of "1's" resides in stages 22 and 23 of the data shift register 125 the AND-gate 130 is enabled, and since the flip-flop 111 is priorly reset upon recognition of at least one pair of the preamble the AND-gate 114 will be enabled and the flip-flop 112 set to its "1" state. During the time that the flip-flop 112 is in the "1" state, the AND-gate 117 will be enabled at the occurrence of each advance pulse at the output of the AND-gate 121. Accordingly, immediately after the start pattern has been found to reside in stages 22 and 23 of the data shift register 125, the five-stage counter 124 will be incremented synchronously with the advancing of data through the data shift register 125. The five-stage counter 124 is capable of counting to the value 32. However, by internal connections it is arranged to count to the value 24 and to then be recycled to the count of zero. As seen in FIG. 1, the AND-gate 122 is connected to the "0" output terminals of stages "0" and "2" and to the "1" output terminal of stage "1" of the three-stage counter 120. Accordingly, the AND-gate 122 is enabled shortly after the AND-gate 121 is enabled. Specifically, AND-gate 122 is enabled upon the occurrence of the second pulse on conductor 150 succeeding the enabling of the AND-gate 121. Since the pulses on conductor 150 represent eight phases of one bit time on the data track, the AND-gate 122 is enabled one-fourth of a data track bit time after the AND-gate 121 is enabled. The AND-gates 128 are employed to gate the contents of the data shift register 125 to a data utilization circuit which is not shown. The AND-gates 128 correspond in number to the stages of the data shift register 125 and are enabled by signals on the count of 24, conductor 127, the conductor 126, and the "1" output terminals of their corresponding stages of the data shift register 125.

The conductor 155 connects the output of the AND-gate 122 to a timing terminal of the five-stage counter 124. As previously noted, the five-stage counter 124 is arranged to count to 24 and to then be recycled to the count of zero. The recycling occurs in synchronism with the signal on conductor 155. Therefore, upon the occurrence of the next succeeding advance pulse on conductor 123 the five-stage counter 124 is advanced to the count of one which indicates that the first bit of the next succeeding data word has been placed in stage 23 of the data shift register 125.

The above description illustrates the application of my invention to but one illustrative embodiment and, as previously noted herein, my invention may be employed to advantage to read data from serial memory such as magnetic disks having a different pattern of information at the disk clock track. For example, rather than employing a disk clock track which generates a pulse for each bit position of the data track, it is possible to employ a clock track wherein a "1" occurs in alternate bit positions. In this case, the oscillator 101 would have a frequency 16 times the bit repetition rate of the information on the disk clock track and various elements of FIG. 1 are adjusted in size to accommodate this change. For example, the counter 102 and the counter 120 would each be four-stage counters rather than the three-stage counters shown in the illustrative embodiment. Similarly, other changes may be incorporated without departing from the spirit and scope of my invention.

What is claimed is:

1. A circuit arrangement for processing serial data obtained from a track of a recording medium such as a magnetic disk comprising an independent timing track and a plurality of data tracks comprising:

means for reading information from said timing track, a local clock pulse circuit for generating output pulses having a frequency $n$ times the frequency of information occurring on said timing track, said local clock circuit comprising an input terminal connected to said reading means and responsive to said information read from said timing track for controlling the frequency and phase of said output pulses;

means for reading data from one of said data tracks, a data shift register comprising a serial data input terminal connected to said last-named means and a plurality of output terminals corresponding to the stages of said shift register;

gating means responsive to said output signals of said local clock circuit for advancing data through said shift register;

data sequence detecting means connected to a plurality of stages of said shift register for detecting a significant pattern of binary digits in said connected stages and for generating a discrete output signal upon the detection of said discrete pattern; and means responsive to said output signal and to said output signals of said local clock circuit for disabling said gating means and for advancing data through said shift register at a frequency equal to the frequency of said information on said timing track in synchronism with a starting point in time corresponding to the occurrence of said discrete output signal.

2. A circuit arrangement in accordance with claim 1 further comprising a second data sequence detecting means connected to a further plurality of said stages of said shift register for generating a start signal upon detection of a significant pattern of binary digits in said connected stages;

means connected to said second sequence-detecting means and enabled in response to said start signal for generating word gating signals and means responsive to said word gating signals and to output signals of said pulse generating means for transferring the contents of said shift register to a data utilization circuit.

3. A circuit arrangement for processing serial data obtained from a track of a recording medium such as a magnetic disk comprising a timing track and a plurality of data tracks comprising:

means for reading information from said timing track, a local clock pulse circuit connected to said reading means for generating output pulses having a frequency $n$ times the frequency of the information read from said timing track and phase locked to said information read from said timing track;

means for reading data from one of said data tracks, a data shift register comprising a serial data input terminal connected to said last-named means and a plurality of output terminals corresponding to the stages of said shift register;

means responsive to output signals of said local clock circuit for advancing data through said shift register at a frequency equal to the frequency of the output signals of said local clock circuit;

sequence-detecting means connected to a plurality of stages of said shift register for detecting a significant pattern of binary digits in said connected stages and for generating a discrete output signal upon the detection of said discrete pattern; and means responsive to said output signal and to said output pulses of said local clock circuit for advancing data through said shift register at a frequency equal to the frequency of said information read from said timing track and starting at a point in time corresponding to the occurrence of said discrete output signal.

4. A circuit arrangement for processing serial data obtained from a track of a recording medium such as a magnetic disk comprising a timing track and a plurality of data tracks comprising:

first reading means for reading information from said timing track;

second reading means for reading information from each of said data tracks;

a local clock circuit comprising: pulse-generating means for generating output pulses having a repetition rate of $n$ times the repetition rate of the information occurring on said timing track, said pulse-generating means comprising an input terminal and an output terminal and means responsive to signals supplied to said input terminal thereof for varying the phase and repetition rate of the pulses appearing at said output terminal thereof, a frequency divider circuit comprising an input terminal connected to said output terminal of said pulse-generating means and an output terminal, said frequency-dividing circuit proportioned to divide by the factor *n*; phase discriminating means comprising a first input terminal connected to the output terminal of said first reading means, a second input terminal connected to said output terminal of said frequency-dividing circuit, an output terminal, and means for generating output signals in accordance with the relative phase relationships of the signals applied to said first and said second input terminals thereof; said output terminal of said phase discriminating means coupled to said input terminal of said pulse-generating means;

a plurality of data-receiving channel circuits each comprising:

a shift register comprising a serial input terminal, a plurality of output terminals corresponding to the stages of said shift register, and a data advance terminal;

gating means connected to said output terminal of said pulse-generating means for advancing data through the stages of said shift register at a rate corresponding to the repetition rate of said pulse-generating means;

data sequence detecting means connected to output terminals of a plurality of said stages of said shift register, said sequence detector means comprising means for generating a discrete output signal upon the occurrence of a particular pattern of binary digits in said connected stages; and means responsive to said discrete output signal and to said output signals of said pulse-generating means and coupled to said advance terminal of said shift register for advancing data through said shift register at a rate corresponding to (the pulse repetition rate of said pulse generating means)/*n* and starting at a point in time corresponding to the occurrence of said discrete output signal.

5. A circuit arrangement for processing serial data obtained from a track of a recording medium such as a magnetic disk comprising an independent timing track and a plurality of data tracks comprising:

first reading means for reading information from said timing track;

pulse-generating means connected to the output terminal of said first reading means and comprising means for generating output pulses having a pulse repetition rate of *n* times the pulse repetition rate of information occurring on said timing track and in phase synchronism with said information;

a plurality of second reading means corresponding in number to said plurality of data tracks and a corresponding plurality of data-receiving channels individually connected to corresponding ones of said second reading means; each of said data-receiving channels comprising a plural-stage data shift register comprising: an input terminal connected to the output terminal of said corresponding second reading means, a data advance terminal and a plurality of output terminals corresponding to the individual stages of said register;

sequence-detecting means connected to a plurality of output terminals of said shift register for detecting a signal pattern of binary digits in said connected stages and for generating a discrete output signal upon the detection of said discrete pattern and coupled to said pulse-generating means and to said advance terminal for advancing data through said shift register at a rate corresponding to the pulse repetition rate of said pulse-generating means; and means coupled to said pulse-generating means, the output terminal of said sequence-detecting means, and to said advance terminal for disabling said gating means and for advancing data through said data shift register at a rate corresponding to the pulse repetition rate of information occurring on said timing track and starting at a point in time corresponding to the occurrence of said discrete output signal.

6. A circuit arrangement for processing serial data obtained from a track of a recording medium such as a magnetic disk comprising a timing track and a plurality of data tracks and comprising:

means coupled to said timing track for generating output signals having a pulse repetition rate of *n* times the pulse repetition rate of information occurring on said timing track and synchronized to said information;

a channel data receiving circuit for each of said data tracks comprising:

shift register means coupled to a corresponding one of said data tracks, sequence-detecting means coupled to said shift register means for detecting a significant pattern of binary digits in particular stages of said shift register means and for generating a discrete start signal upon the detection of said discrete pattern; gating means responsive to output signals of said pulse-generating means for advancing data through said shift register means in synchronism with said output pulses of said pulse-generating means; and data-advancing means responsive to said start signal for disabling said gating means and for generating signals for advancing data through said shift register means at a rate corresponding to the repetition rate of information occurring on said timing track and starting at a point in time corresponding to the occurrence of said discrete signal.

7. A circuit arrangement in accordance with claim 6 wherein said shift register comprises *m* stages;

counting means comprising an input terminal coupled to said data-advancing means for generating output signals having a pulse repetition rate corresponding to the repetition rate of information occurring on said timing track divided by *m*; and gating means connected to the output terminals of said data shift register for transferring the contents of said data shift register to a data utilization circuit; said gating means responsive to said output signals of said counting means and to said output signals of said pulse-generating means.

* * * * *